United States Patent
Conover et al.

(10) Patent No.: US 7,346,739 B1
(45) Date of Patent: Mar. 18, 2008

(54) FIRST-IN-FIRST-OUT MEMORY SYSTEM AND METHOD FOR PROVIDING SAME

(75) Inventors: Kurt M. Conover, Albuquerque, NM (US); John H. Linn, Albuquerque, NM (US); Anita L. Schreiber, Sandia Park, NM (US)

(73) Assignee: Xilinx, Inc., San Jose, CA (US)

( * ) Notice: Subject to any disclaimer, the term of this patent is extended or adjusted under 35 U.S.C. 154(b) by 359 days.

(21) Appl. No.: 10/993,862

(22) Filed: Nov. 19, 2004

(51) Int. Cl.
*G06F 12/00* (2006.01)

(52) U.S. Cl. .................. 711/131; 711/109; 711/154

(58) Field of Classification Search ............... None
See application file for complete search history.

(56) References Cited

U.S. PATENT DOCUMENTS

| | | | |
|---|---|---|---|
| 4,942,553 A | 7/1990 | Dalrymple et al. | |
| 5,083,269 A * | 1/1992 | Syobatake et al. | 711/100 |
| 5,426,756 A | 6/1995 | Shyi et al. | |
| 5,898,893 A | 4/1999 | Alfke | |
| 6,041,370 A | 3/2000 | Guyt | |
| 6,308,249 B1 | 10/2001 | Okazawa | |
| 6,337,893 B1 | 1/2002 | Pontius | |
| 6,366,529 B1 | 4/2002 | Williams et al. | |
| 6,366,530 B1 | 4/2002 | Sluiter et al. | |
| 6,389,490 B1 | 5/2002 | Camilleri et al. | |
| 6,401,148 B1 | 6/2002 | Camilleri | |
| 6,405,269 B1 | 6/2002 | Ebeling et al. | |
| 6,434,642 B1 | 8/2002 | Camilleri et al. | |
| 6,687,255 B1 * | 2/2004 | Holm et al. | 370/412 |
| 6,751,723 B1 | 6/2004 | Kundu et al. | |
| 6,838,902 B1 | 1/2005 | Elftmann et al. | |
| 6,864,710 B1 | 3/2005 | Lacey et al. | |
| 6,934,198 B1 * | 8/2005 | Lowe et al. | 365/189.05 |
| 6,937,172 B1 | 8/2005 | Lowe et al. | |
| 6,956,776 B1 | 10/2005 | Lowe et al. | |

(Continued)

OTHER PUBLICATIONS

Clifford E. Cummings and Peter Alfke; "Simulation and Synthesis Techniques for Asynchronous FIFO Design with Asynchronous Pointer Comparisons"; Re. 1.1; SNUG San Jose 2002; pp. 1-18.

(Continued)

*Primary Examiner*—Donald Sparks
*Assistant Examiner*—Mehdi Namazi
(74) *Attorney, Agent, or Firm*—Robert Brush; Michael R. Hardaway

(57) ABSTRACT

First-in-first-out (FIFO) memory system and method for providing the same is described. In one example, a dual-port memory circuit includes first storage locations for defining a plurality of FIFOs, second storage locations for storing status information for each of the FIFOs, a first port, and a second port. The first port includes a write data terminal for receiving write data and a write address terminal for receiving write addresses. Each of the write addresses includes a first portion for selecting a FIFO of the FIFOs and a second portion for selecting a storage location in the dual-port memory circuit. The second port includes a read data terminal for providing read data and a read address terminal for receiving read addresses. Each of the read addresses includes a first portion for selecting a FIFO of the FIFOs and a second portion for selecting a storage location in the dual-port memory circuit.

16 Claims, 6 Drawing Sheets

U.S. PATENT DOCUMENTS 7,038,952 B1   5/2006   Zack et al.
7,106,098 B1 * 9/2006   Zack et al. ................... 326/40
7,254,677 B1   8/2007   Lowe et al.

OTHER PUBLICATIONS

Xilinx, Inc.; "170 MHz FIFOs Using the Virtex Block SelectRAM+ Feature"; XAPP131 (v 1.7); Mar. 26, 2003; available from Xilinx, 2100, Logic Drive, San Jose, California 95124; pp. 1-7.

Xilinx, Inc.; "Synchronous and Asynchronous FIFO Designs"; XAPP 051 (Version 2.0); Sep. 17, 1996; available from Xilinx, 2100 Logic Drive, San Jose, California 95124; pp. 1-12.

Xilinx, Inc.; "Asynchronous FIFO in Virtex-II FPGAs"; TechXclusives; downloaded Apr. 12, 2004 from http://support.xilinx.com/xlnx/xweb/sil_tx_printfriendly.jsp?BV_SessionID=@@@@116 ...; pp. 1-3.

* cited by examiner

FIRST-IN-FIRST-OUT MEMORY SYSTEM AND METHOD FOR PROVIDING SAME

FIELD OF THE INVENTION

One or more aspects of the present invention relate generally to memory subsystems and, more particularly, to a first-in-first-out (FIFO) memory system and method for providing the same.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBS) surrounded by a ring of programmable input/output blocks (IOBs). The CLBs and IOBs are interconnected by a programmable interconnect structure. The CLBS, IOBS, and interconnect structure are typically programmed by loading a stream of configuration data (known as a bitstream) into internal configuration memory cells that define how the CLBS, IOBS, and interconnect structure are configured. An FPGA may also include various dedicated logic circuits, such as memories, microprocessors, digital clock managers (DCMs), and input/output (I/O) transceivers.

Notably, an FPGA may include blocks of random access memory (RAM), referred to as block RAMs (BRAMs). BRAMs may comprise static RAM (SRAM), and may be dual ported (i.e., two pairs of data and address ports). BRAMs may be used to implement various memory structures, such as first-in-first-out (FIFO) memories (referred to as a FIFOs). Historically, an individual BRAM has been used to implement a single FIFO having a depth of the BRAM size (e.g., 2048 bytes). If an application requires more than one FIFO, then each additional FIFO consumes an additional BRAM. BRAMs are a scarce resource in an FPGA. Thus, use of a BRAM to implement a single FIFO becomes a limiting constraint in an application that requires more FIFOs than there are BRAMs in a given FPGA. Accordingly, there exists a need in the art for a method and apparatus that provides an increased number of FIFOs for a given set of BRAMs in an FPGA.

SUMMARY OF THE INVENTION

First-in-first-out (FIFO) memory system and method for providing the same is described. In one embodiment, a dual-port memory circuit includes first storage locations for defining a plurality of FIFOs, second storage locations for storing status information for each of the FIFOs, a first port, and a second port. The first port includes a write data terminal for receiving write data and a write address terminal for receiving write addresses. Each of the write addresses comprises a first portion for selecting a FIFO of the FIFOs and a second portion for selecting a storage location in the dual-port memory circuit. The second port includes a read data terminal for providing read data and a read address terminal for receiving read addresses. Each of the read addresses comprises a first portion for selecting a FIFO of the FIFOs and a second portion for selecting a storage location in the dual-port memory circuit. In one embodiment, the dual-port memory circuit comprises BRAM embedded within an FPGA.

In another embodiment, a plurality of FIFOs is defined using first storage locations of a dual-port memory circuit. A FIFO is selected from the plurality of FIFOs. Status information is obtained for the selected FIFO from second storage locations of the dual-port memory circuit. A storage location associated with the selected FIFO is selected in response to the obtained status information for the selected FIFO.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
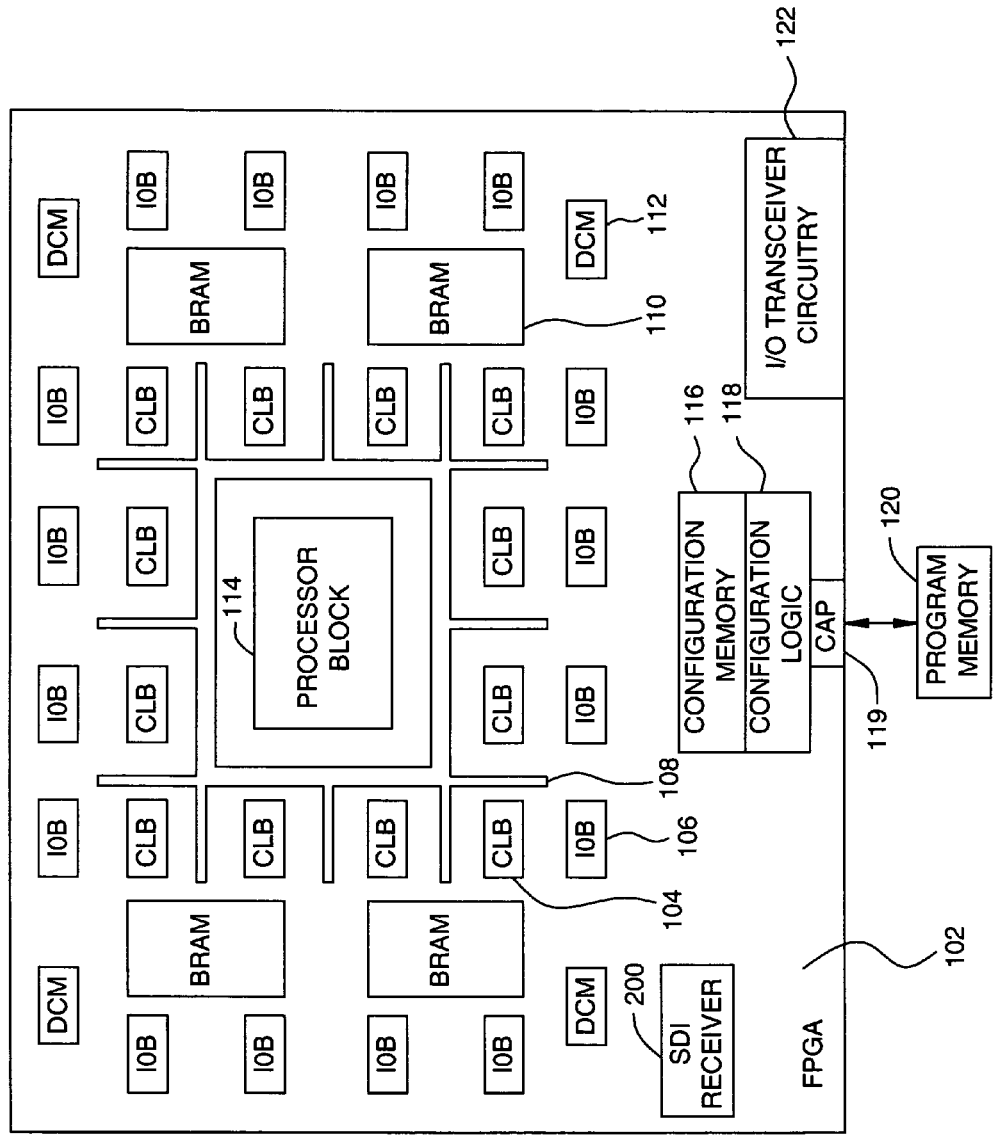
FIG. 1 is a block diagram depicting an exemplary embodiment of an FPGA coupled to a program memory.

FIG. 1 is a block diagram depicting an exemplary embodiment of an FPGA 102 coupled to a program memory 120. The FPGA 102 illustratively comprises programmable logic circuits or "blocks", illustratively shown as CLBs 104, IOBs 106, and programmable interconnect 108, as well as configuration memory 116 for determining the functionality of the FPGA 102. The FPGA 102 may also include an embedded processor block 114, as well as various dedicated internal logic circuits, illustratively shown as blocks of random access memory ("BRAM 110"), configuration logic 118, digital clock management (DCM) blocks 112, and input/output (I/O) transceiver circuitry 122. Notably, the FPGA 102 may include a communication controller 200, described below with respect to FIG. 2. Those skilled in the art will appreciate that the FPGA 102 may include other types of logic blocks and circuits in addition to those described herein.

As is well known in the art, the IOBs 106, the CLBs 104, and the programmable interconnect 108 may be configured to perform a variety of functions. Notably, the CLBs 104 are programmably connectable to each other, and to the IOBs 106, via the programmable interconnect 108. Each of the CLBs 104 may include one or more "slices" and programmable interconnect circuitry (not shown). Each CLB slice in turn includes various circuits, such as flip-flops, function generators (e.g., a look-up tables (LUTs)), logic gates, memory, and like type well-known circuits. The IOBs 106 are configured to provide input to, and receive output from, the CLBs 104.

Configuration information for the CLBs 104, the IOBs 106, and the programmable interconnect 108 is stored in the configuration memory 116. The configuration memory 116 may include static random access memory (SRAM) cells. The configuration logic 118 provides an interface to, and controls configuration of, the configuration memory 116. A configuration bitstream produced from the program memory 120 may be coupled to the configuration logic 118 through a configuration port 119. The configuration process of FPGA 102 is also well known in the art.

The I/O transceiver circuitry 122 may be configured for communication over any of a variety of media, such as wired, wireless, and photonic, whether analog or digital. The I/O transceiver circuitry 122 may comprise gigabit or multi-gigabit transceivers (MGTs). The DCM blocks 112 provide well-known clock management circuits for managing clock signals within the FPGA 102, such as delay lock loop (DLL) circuits and multiply/divide/de-skew clock circuits.

The processor block 114 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic of the FPGA 102 (e.g., CLBs 104, IOBs 106). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art.

The processor block 114 is coupled to the programmable logic of the FPGA 102 in a well known manner. For purposes of clarity by example, the FPGA 102 is illustrated with 12 CLBs, 16 IOBs, 4 BRAMS, 4 DCMs, and one processor block. Those skilled in the art will appreciate that actual FPGAs may include one or more of such components in any number of different ratios. For example, the FPGA 102 may be selected from the VIRTEX-II PRO family of products, commercially available from Xilinx, Inc. of San Jose, Calif.

Figure 2:
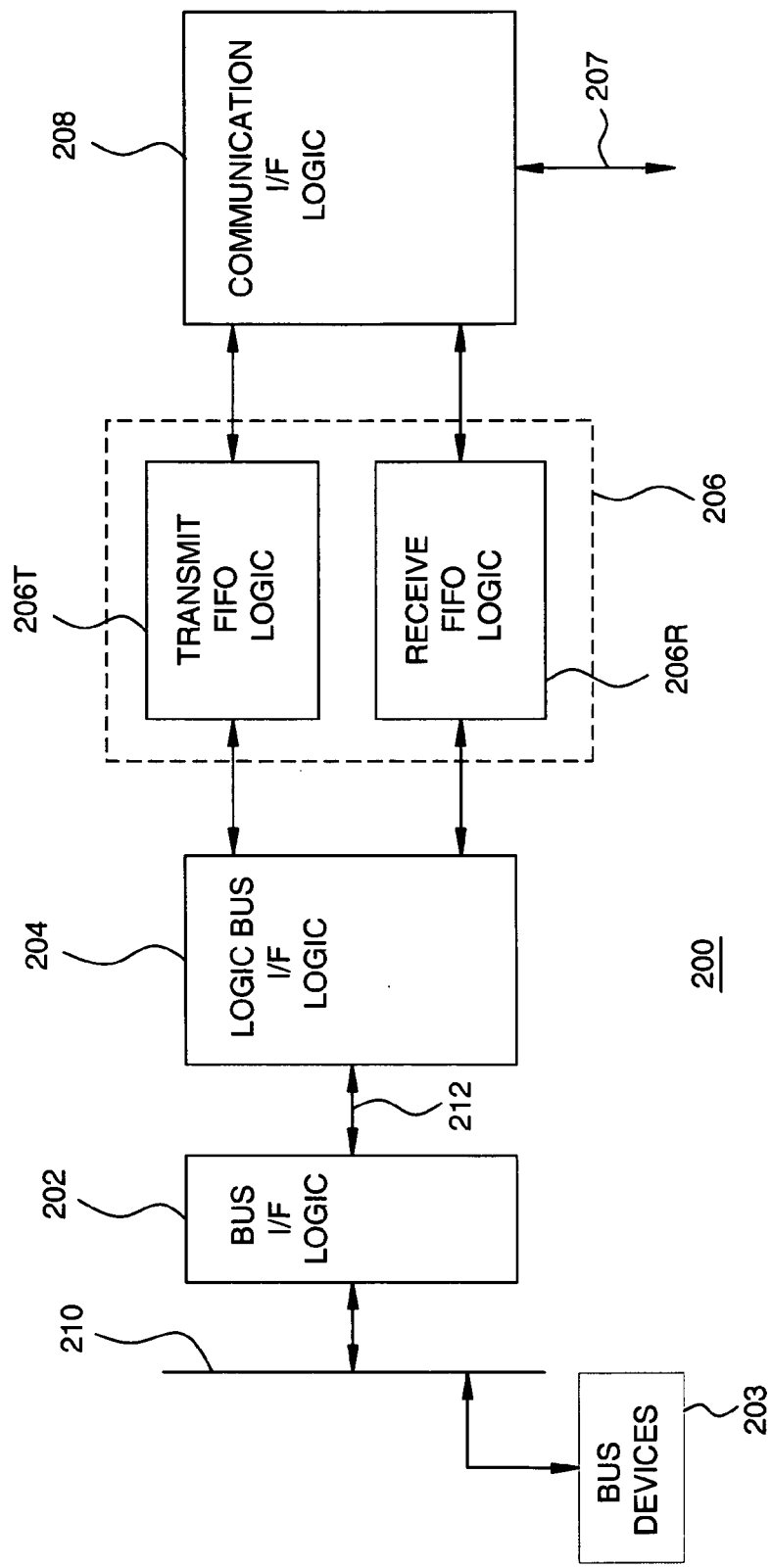
FIG. 2 is a block diagram depicting an exemplary embodiment of a communication controller in which the present invention may be utilized.

FIG. 2 is a block diagram depicting an exemplary embodiment of a communication controller 200 in which the present invention may be utilized. The communication controller 200 may comprise dedicated circuitry embedded within the FPGA 100 of FIG. 1. Alternatively, the communication controller 200 may be implemented using programmable logic of the FPGA 100. The communication controller 200 illustratively comprises bus interface logic 202, local bus interface logic 204, communication interface logic 208, transmit first-in-first-out (FIFO) memory logic ("transmit FIFO logic 206T"), and receive FIFO memory logic ("receive FIFO logic 206R"). The transmit FIFO logic 206T and the receive FIFO logic 206R are collectively referred to as FIFO logic 206.

A port of the bus interface logic 202 is coupled to a system bus 210 for communication with processor(s), memory, peripheral device(s), and like type devices within the FPGA 100 (generally shown as bus devices 203). For example, the system bus 210 may comprise a processor local bus (PLB). Another port of the bus interface logic 202 is coupled to a local bus 212. The bus interface logic 202 is configured to provide a communication interface between the system bus 210 and the local bus 212.

A port of the local bus interface logic 204 is coupled to the local bus 212. The local bus interface logic 204 is configured to provide a communication interface between the local bus 212 and the FIFO logic 206. Each of the transmit FIFO logic 206T and the receive FIFO logic 206R includes a plurality of channels, where each channel supports a FIFO configured to store a plurality of words. An output data port of the local bus interface logic 204 is coupled to an input data port of the transmit FIFO logic 206T. An input data port of the local bus interface logic 204 is coupled to an output port of the receive FIFO logic 206R. The local bus interface logic 204 is configured to provide channel select data and request data to each of the transmit FIFO logic 206T and the receive FIFO logic 206R. The local interface logic 204 is configured to receive status data and acknowledgement data from each of the transmit FIFO logic 206T and the receive FIFO logic 206R.

A port of the communication interface logic 208 is coupled to a data link 207. The data link 207 is configured to receive a data stream from a transceiver source. For example, a data stream may be provided by the I/O transceiver circuitry 122 of the FPGA 100. The communication interface logic 208 is configured to provide an interface between the data link 207 and the FIFO logic 206. Notably, an output data port of the communication interface logic 208 is coupled to an input data port of the receive FIFO logic 206R. An input data port of the communication interface logic 208 is coupled to an output port of the transmit FIFO logic 206T. The communication interface logic 208 is configured to provide channel select data and request data to each of the transmit FIFO logic 206T and the receive FIFO logic 206R. The communication interface logic 208 is configured to receive status data and acknowledgement data from each of the transmit FIFO logic 206T and the receive FIFO logic 206R.

In operation, the communication controller 200 provides a communication interface between the data link 207 and the one or more of the bus devices 203. Data is communicated over the data link 207 using multiple channels. For example, data may be communicated over the data link 207 using an HDLC protocol implemented using multiple channels (e.g., data from a T1 communication link). The transmit FIFO logic 206T stores data that is to be transmitted over the data link 207, such data being received from the system bus 210. The receive FIFO logic 206R stores data that is received from the data link 207, such data to be transmitted to the system bus 210.

In particular, each of the transmit FIFO logic 206T and the receive FIFO logic 206R includes a FIFO for each of the channels supported by the data link 207. Data to be transmitted over a particular channel supported by the data link 207 is received by the local bus interface logic 204. The local bus interface logic 204 provides channel select data to the transmit FIFO logic 206T to select a FIFO associated with the channel. Once a FIFO is selected, the local bus interface logic 204 may receive the status of the selected FIFO (e.g., whether the FIFO can store more data) and may push data into the selected FIFO by transmitting a request and receiving an acknowledgement.

To transmit data within a particular channel supported by the data link 207, the communication interface logic 208 provides channel select data to the transmit FIFO logic 206T to select a FIFO associated with the channel. Once the FIFO is selected, the communication interface logic 208 may receive the status of the selected FIFO (e.g., whether the FIFO has stored data to transmit) and may pop data from the selected FIFO by transmitting a request and receiving an acknowledgement. The retrieved data is then transmitted over the data link 207 within the selected channel. Within the transmit FIFO logic 206T, the local bus interface logic 204 and the communication interface logic 208 may access different FIFOs or the same FIFO simultaneously.

The communication interface logic 208 receives data within a particular channel from the data link 207. The communication interface logic 208 provides channel select data to the receive FIFO logic 206R to select a FIFO associated with the channel. Once a FIFO is selected, the communication interface logic 208 may receive the status of the selected FIFO (e.g., whether the FIFO can store more data) and may push data into the selected FIFO by transmitting a request and receiving an acknowledgement.

To retrieve data within a particular channel supported by the data link 207, the local bus interface logic 204 provides channel select data to the receive FIFO logic 206R to select a FIFO associated with the channel. Once the FIFO is selected, the local bus interface logic 204 may receive the status of the selected FIFO (e.g., whether the FIFO has stored data to transmit) and may pop data from the selected FIFO by transmitting a request and receiving an acknowledgement. The retrieved data is then transmitted over the system bus 210. Within the receive FIFO logic 206R, the local bus interface logic 204 and the communication interface logic 208 may access different FIFOs or the same FIFO simultaneously.

Figure 3:
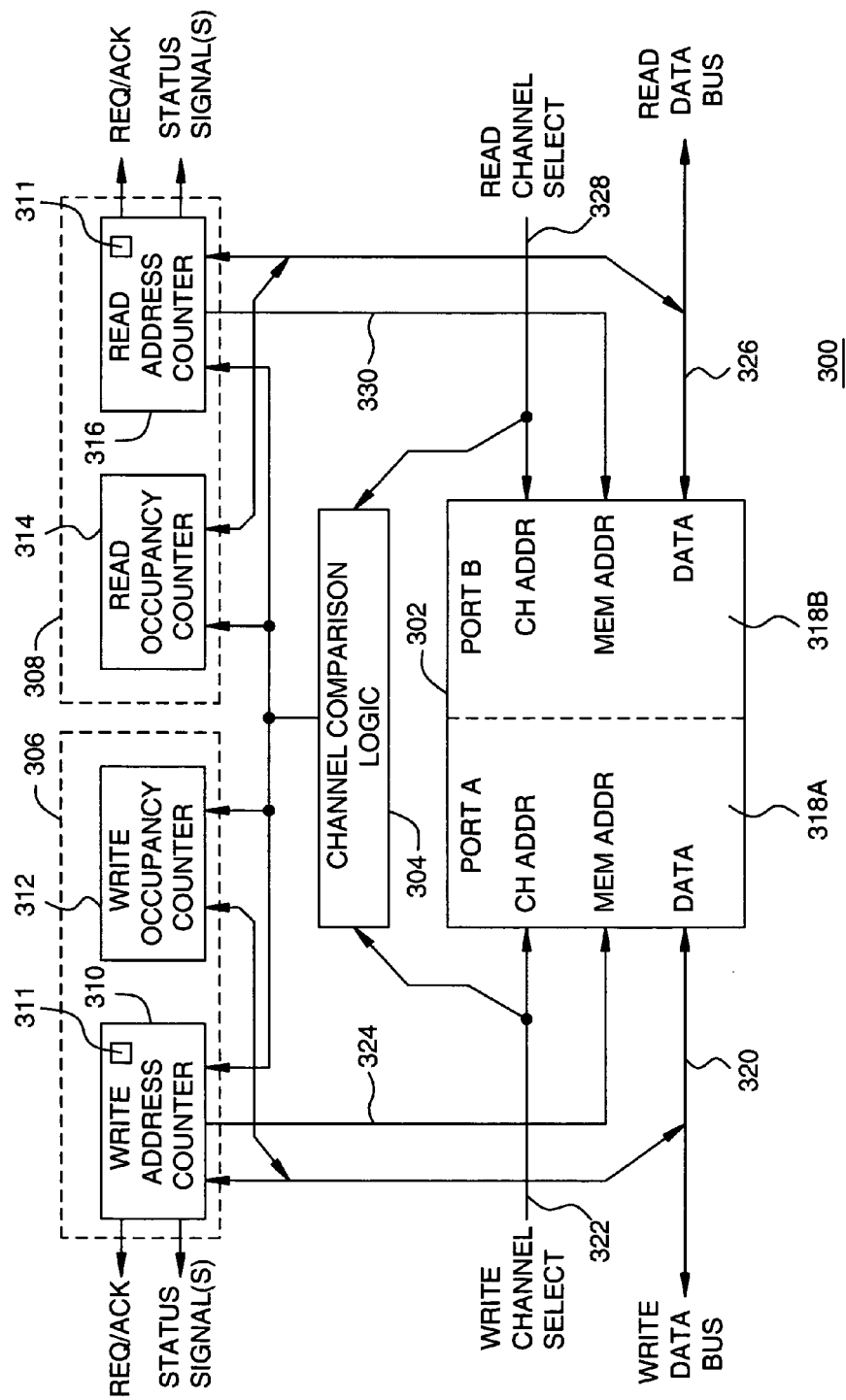
FIG. 3 is a block diagram depicting an exemplary embodiment of FIFO logic constructed in accordance with one or more aspects of the invention.

FIG. 3 is a block diagram depicting an exemplary embodiment of FIFO logic 300 constructed in accordance with one or more aspects of the invention. The FIFO logic 300 may be used within the communication controller 200 of FIG. 2 to implement one or both of the transmit FIFO logic 206T and the receive FIFO logic 206R. The FIFO logic 300 comprises a dual-port memory circuit 302, channel comparison logic 304, write counter circuitry 306, and read counter circuitry 308. The write counter circuitry 306 comprises a write address counter 310 and a write occupancy counter 312. The read counter circuitry 308 comprises a read occupancy counter 314 and a read address counter 316. In one embodiment, the channel comparison logic 304, the write counter circuitry 306, and the read counter circuitry 308 may be implemented within an FPGA using programmable logic blocks. In another embodiment, the channel comparison logic 304, the write counter circuitry 306, and the read counter circuitry 308 may comprise dedicated logic circuitry within an FPGA.

The dual-port memory circuit 302 comprises a RAM. In one embodiment, the dual-port memory circuit 302 comprises RAM embedded within an integrated circuit, such as an FPGA (e.g., BRAM). The dual-port memory circuit 302 includes a port 318A ("port A") and a port 318B ("port B"). The dual-port memory circuit 302 is configured to provide a plurality of channels, where each channel supports a FIFO configured to store a plurality of words. In other words, the dual-port memory circuit 302 provides a plurality of logical FIFOs organized into channels within the dual-port memory circuit 302. The port 318A is used to write data to a selected FIFO, and the port 318B is used to read data from a selected FIFO. The read and write operations are independent from one another and may occur simultaneously, with the exception that the same storage location of a FIFO may not be written to and read from simultaneously.

Figure 4:
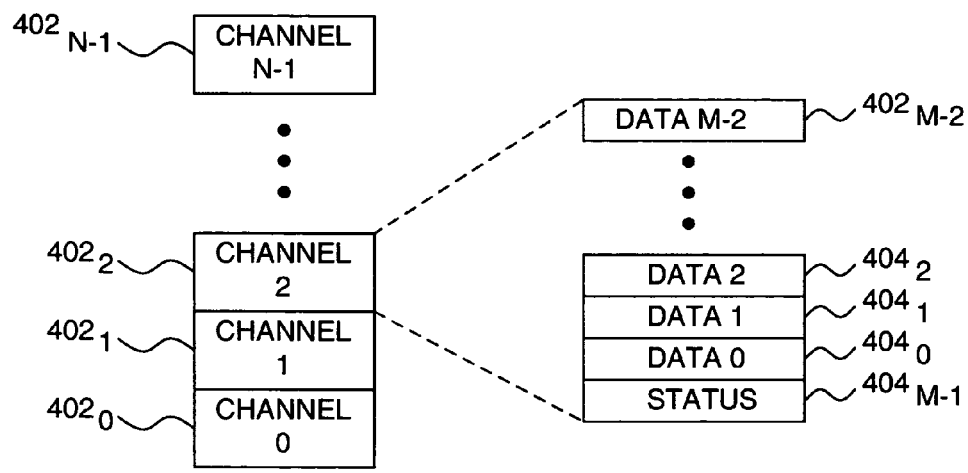
FIG. 4 is a block diagram illustrating an exemplary embodiment of the organization of a dual-port memory circuit shown in FIG. 3.

Notably, FIG. 4 is a block diagram illustrating an exemplary embodiment of the organization of the dual-port memory circuit 302. The dual-port memory circuit 302 is configured to provide N channels $402_0$ through $402_{N-1}$ (collectively referred to as channels 402). Each of the channels 402 includes M storage locations $404_0$ through $404_{M-1}$ (collectively referred to as storage locations 404). For purposes of clarity by example, only the channel $402_2$ is shown in detail. Each of the storage locations 404 is configured to store a word of data. One of the storage locations 404 is reserved for storing status information for the respective one of the channels 402. The remaining storage locations 404 are used to implement a FIFO.

For example, as shown in FIG. 4, the storage location $404_{M-1}$ is used to store status information for the channel $402_2$. The storage locations $404_0$ through $404_{M-2}$ are used to implement a FIFO. The status information includes a write address pointer and a read address pointer. The write address pointer indicates the next one of the storage locations 404 to which data may be written. The read address pointer indicates the next one of the storage locations 404 from which data may be read. As discussed below, the read and write address pointers may also be used to determine the condition of the FIFO (e.g., empty, full, number of vacancies, number of occupied locations, etc.). In this manner, each of the channels 402 is self-contained in that external circuitry is not required to store the status information. Rather, the status information is stored in the storage locations defining the channel.

Returning to FIG. 3, a data terminal of the port 318A is coupled to a data bus 320. A first portion of an address terminal of the port 318A is coupled to a channel select bus 322, and a second portion of the address terminal of the port 318A is coupled to an address bus 324. Together, the address bus 324 and the channel select bus 322 are configured to drive the address terminal of the port 318A with an address value comprising a channel address portion and a memory address portion. For example, the channel address portion may comprise the most significant bits, and the memory address portion may comprise the least significant bits, of a given address value. The channel address portion is used to select a channel implemented by the dual-port memory circuit 302, and the memory address portion is used to select a storage location within the selected channel.

A data terminal of the port 318B is coupled to the data bus 326. A first portion of an address terminal of the port 318B is coupled to a channel select bus 328, and a second portion of the address terminal of the port 318B is coupled to an address bus 330. Together, the address bus 330 and the channel select bus 328 are configured to drive the address terminal of the port 318B with an address value comprising a channel address portion and a memory address portion. Such address values are configured as described above with respect to the port 318A. The channel address portion is used to select a channel implemented by the dual-port memory circuit 302, and the memory address portion is used to select a storage location within the selected channel.

An input interface of the channel comparison logic 304 is coupled to the channel select bus 322 and the channel select bus 328. An output interface of the channel comparison logic 304 is coupled to a control interface of each of the write address counter 310, the write occupancy counter 312, the read occupancy counter 314, and the read address counter 316.

An interface of the write address counter 310 is coupled to the data bus 320. An output interface of the write address counter 310 is coupled to the address bus 324. An interface of the write occupancy counter 312 is in communication with the data bus 320. Another interface of the write occupancy counter 312 is in communication with an interface of the read occupancy counter 314. The write address counter 310 is configured to receive a request signal and to provide an acknowledgment signal. The write address counter 310 is also configured to provide one or more status signals, such as a vacancy value (i.e., the number of empty locations in a given channel), a half-full flag, a full flag, an almost-full flag, and the like. Notably, the write address counter 310 includes control logic 311 for computing the "fullness" of the selected channel. The write address counter 310 may obtain the current vacancy value from the write occupancy counter 312.

An interface of the read address counter 316 is coupled to the data bus 326. An output interface of the read address counter 310 is coupled to the address bus 330. An interface of the read occupancy counter is in communication with the data bus 326. The read address counter 316 is configured to receive a request signal and to provide an acknowledgement signal. The read address counter 316 is also configured to provide one or more status signals, such as an occupancy value (i.e., the number of locations used to store data in the channel), a half-empty flag, an empty flag, an almost-empty flag, and the like. Notably, the read address counter 316 includes control logic 317 for computing the "emptiness" of the selected channel. The read address counter 316 may obtain the current occupancy value from the read occupancy counter 314. For purposes of clarity by example, the write occupancy counter 312 is described as tracking a vacancy value and the read occupancy counter 314 is described as tracking an occupancy value. It is to be understood, however, that each of the write occupancy counter 312 and the read occupancy counter 314 may track either a vacancy value or an occupancy value. Further details are disclosed in co-pending U.S. patent application Ser. No. 10/838,957, entitled "First-In, First-Out Buffer System in an Integrated Circuit", by Wayson J. Lowe et. al., filed May 4, 2004, which is herein incorporated by reference.

In operation, the FIFO logic 300 performs read operations and write operations. Operation of the FIFO logic 300 for a write operation is substantially similar to that for a read operation and may be understood with reference to FIGS. 6 and 7 described below.

Figure 6:
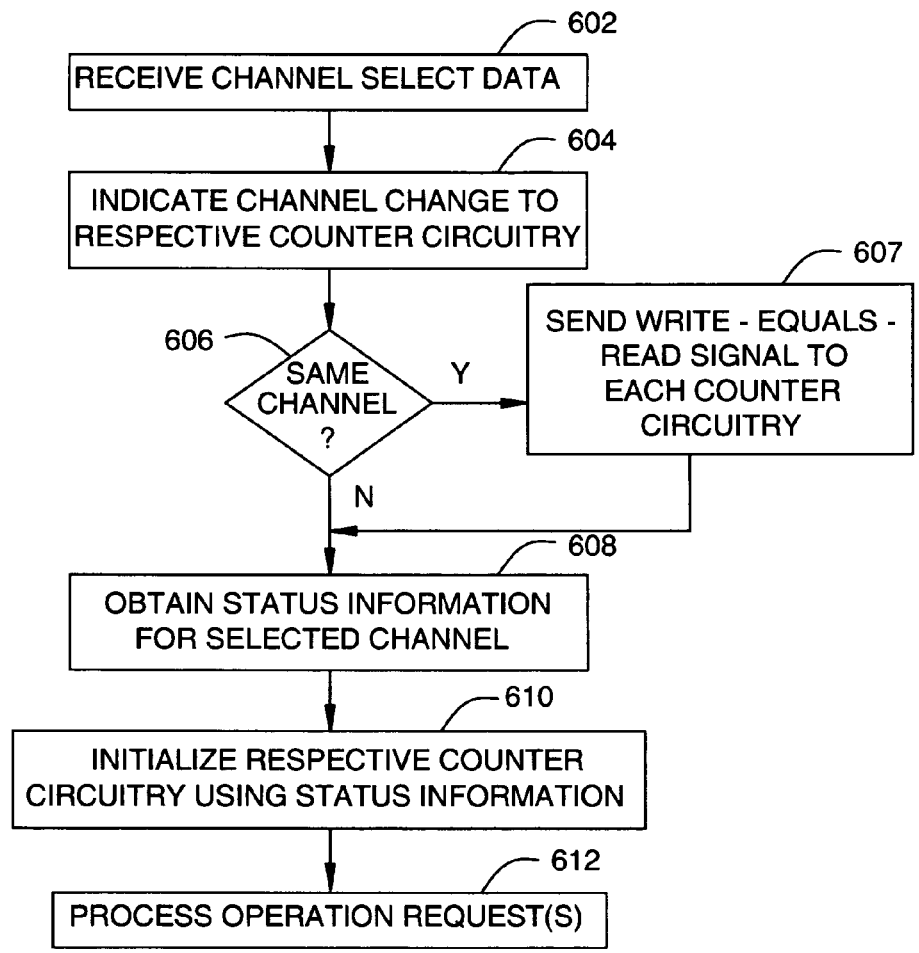
FIG. 6 is a flow diagram depicting an exemplary embodiment of a method for initializing the FIFO logic of FIG. 3 in response to a channel selection.

Notably, FIG. 6 is a flow diagram depicting an exemplary embodiment of a method 600 for initializing the FIFO logic 300 in response to a channel selection. At step 602, channel select data is received at a port of the dual-port memory circuit 302. For a write operation, the channel select data is received via the bus 322, which drives the channel address portion of the address terminal of the port 318A. For a read operation, the channel select data is received via the bus 328, which drives the channel address portion of the address terminal of the port 318B. The channel select data selects one of the FIFOs implemented by the dual-port memory circuit 302 for performing an operation (i.e., a write operation or a read operation).

At step 604, a channel change signal is sent to the respective counter circuitry. The channel comparison logic 304 is configured to receive channel select data from both the bus 322 and the bus 328. If the channel comparison logic 304 detects a change in the channel select data on either the bus 322 or the bus 328, the channel comparison logic 304 sends a channel change signal to write counter circuitry 306 or the read counter circuitry 308, respectively.

At step 606, a determination is made as to whether the same channel is selected for both writing and reading. The channel comparison logic 304 is configured to determine if the channel select data on each of the bus 322 and the bus 328 indicate the same channel. If so, the method 600 proceeds to step 607, where the channel comparison logic 304 sends a write-equals-read signal to both the write occupancy counter 312 and the read occupancy counter 314. As described below, the process of incrementing the write counter circuitry 306 and the read counter circuitry 308 is modified if the same channel is selected for both writing and reading operations. If the channel select data on each of the bus 322 and the bus 328 indicate a different channel, the method 600 proceeds to step 608.

At step 608, status information for the selected channel is obtained. In response to a write channel change, the write address counter 310 couples a memory address value to the address bus 324 to access the status information for the selected channel. In response to a read channel change, the read address counter 316 couples a memory address value to the address bus 330 to access the status information for the selected channel. The status information for each channel may be stored at a predefined offset address with respect to the channel address.

At step 610, the respective counter circuitry is initialized using the status information. In response to a write channel change, the write address pointer of the status information is used to initialize the write address counter 310. The write and read address pointers may be used to compute a vacancy value (i.e., the number of storage locations in the selected channel capable of storing data) for initializing the write occupancy counter 312. In response to a read channel change, the read address pointer of the status information is used to initialize the read address counter 316. The write and read address pointers may be used to compute an occupancy value (i.e., the number of locations used to store data in the channel) to initialize the read occupancy counter 314. The occupancy/vacancy computation is described below with respect to FIG. 5.

At step 612, one or more operation requests are processed. A method of processing operation requests is described below with respect to FIG. 7. The method 600 may be repeated each time a new channel is selected on either the write side (port 318A) or the read side (port 318B).

Figure 7:
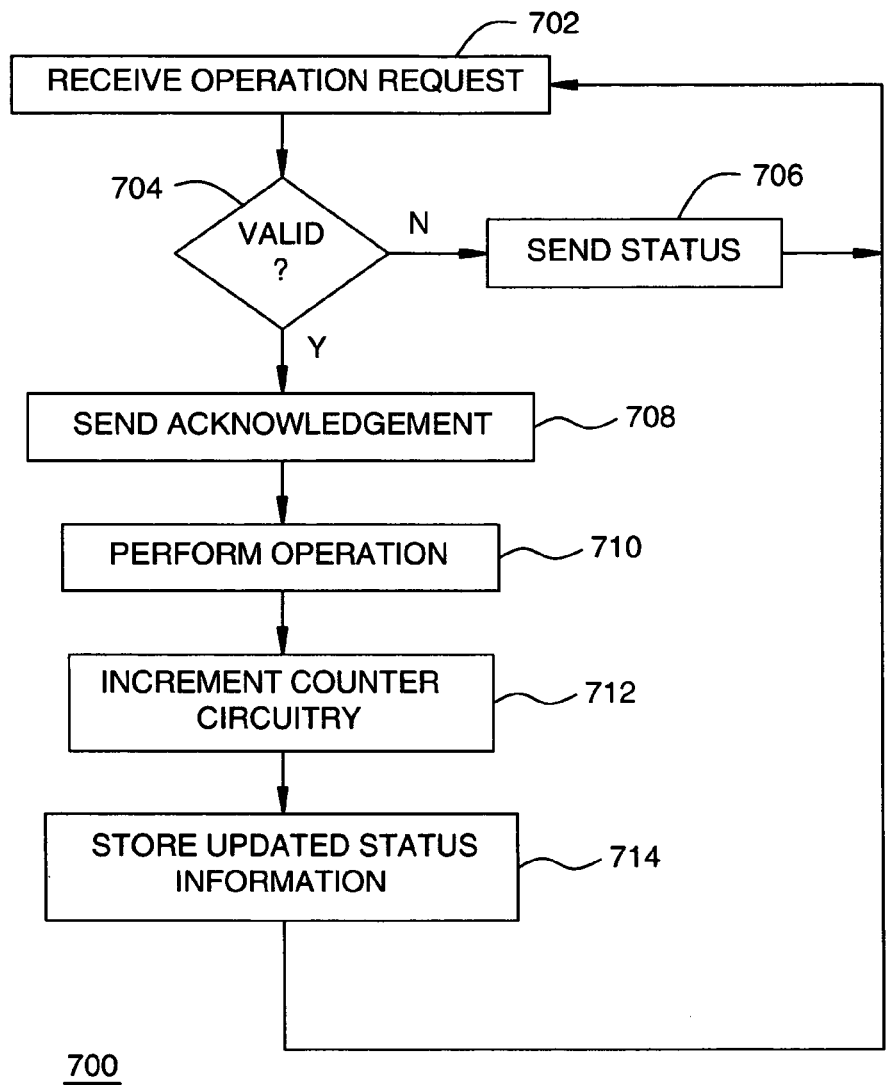
FIG. 7 is a flow diagram depicting an exemplary embodiment of a method for processing an operation request in the FIFO logic of FIG. 3.

FIG. 7 is a flow diagram depicting an exemplary embodiment of a method 700 for processing an operation request in the FIFO logic 300. At step 702, an operation request is received at the respective counter circuitry. For a write operation, a request is received at the write address counter 310. For a read operation, a request is received at the read address counter 316. At step 704, a determination is made as to whether the requested operation is valid with respect to the selected channel. For a write operation, the write request is valid if the selected channel is not full. The control logic 311 is configured to determine the status of the selected channel for writing. For a read operation, the read request is valid if the selected channel is not empty. The control logic 317 is configured to determine the status of the selected channel for reading.

Figure 5:
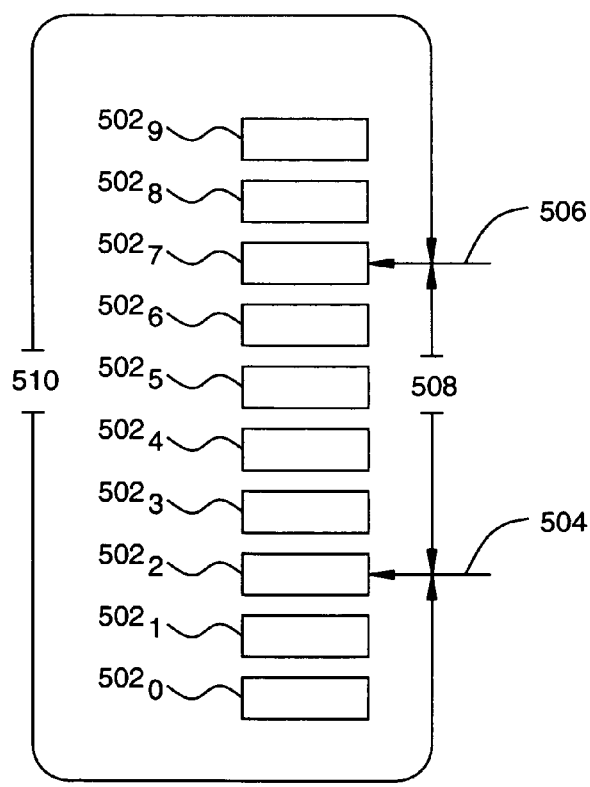
FIG. 5 is a block diagram illustrating an occupancy/vacancy computation for the FIFO logic of FIG. 3.

Notably, FIG. 5 is a block diagram illustrating an occupancy/vacancy computation for the FIFO logic 300. In the present example, storage locations 502O through 5029 (collectively referred to as storage locations 502) define a particular channel in the dual-port memory circuit 302. A read address pointer 504 points to the storage location 5022. A write address pointer 506 points to the storage location 5027. The read address pointer 504 indicates the respective one of the storage locations 502 from which data is to be read. The write address pointer 506 indicates the respective one of the storage locations 502 to which data is to be written.

A difference 508 between the read address pointer 504 and the write address pointer 506 provides an occupancy value for the channel. If the occupancy value is zero (i.e., the read address pointer 504 points to the same location as the write address pointer 506), then the channel is empty. The read occupancy counter 314 keeps track of the current occupancy value for the selected channel. A difference 510 between the read address pointer 504 and the write address pointer 506 provides a vacancy value for the channel. If the vacancy value is zero (i.e., there are no storage locations 502 between the read address pointer 504 and the write address pointer 506 in the counter-clockwise direction), then the channel is full. The write occupancy counter 312 keeps track of the current vacancy value for the selected channel.

Returning to FIG. 7, if at step 704 the operation is valid, the method 700 proceeds to step 708. Otherwise, the method 700 proceeds to step 706. At step 706, one or more status signals may be asserted to indicate that the selected channel is empty for a read operation or full for a write operation. At step 708, an acknowledgement is sent indicating that the requested operation may proceed.

At step 710, the requested operation is performed (i.e., the selected channel is written to or read from). For a write operation, the current value of the write address counter 310 is coupled to the dual-port memory circuit 302 via the address bus 324. That is, the current value of the write address counter 310 is used as the memory address for the selected channel. Data on the bus 320 is then written to an address defined by the channel address and the memory address on the port 318A. For a read operation, the current value of the read address counter 316 is coupled to the dual-port memory circuit 302 via the address bus 330. That is, the current value of the read address counter 316 is used as the memory address for the selected channel. Data from an address defined by the channel address and the memory address on the port 318B is then coupled to the bus 326.

At step 712, the respective counter circuitry is adjusted. For a write operation, the write address counter 310 is incremented to the next address. The write occupancy counter 312, which keeps track of the current vacancy value in the present embodiment, is decremented. For a read operation, the read address counter 316 is incremented to the next address. The read occupancy counter 314, which keeps track of the current occupancy value in the present embodiment, is incremented. The selected channel may be selected for both reading and writing as indicated by the write-equals-read signal asserted by the channel comparison logic 304. In such a case, for a write operation, the write occupancy counter 312 notifies the read occupancy counter 314 of the write operation so that the read occupancy counter 314 is incremented. For a read operation, the read occupancy counter 314 notifies the write occupancy counter 312 of the read operation so that the write occupancy counter 312 is decremented.

At step 714, updated status information is stored in the dual-port memory circuit 302 for the selected channel. Notably, for a write operation, the incremented write address value is stored to update the status information for the selected channel. For a read operation, the incremented read address value is stored to update the status information for the selected channel. The process 700 is repeated for each operation request for a given selected channel. If a new channel is selected, the process 600 of FIG. 6 is executed to initialize the respective counter circuitry, as described above.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A first-in-first-out (FIFO) memory apparatus, comprising:
a dual-port memory circuit, including:
first storage locations for defining a plurality of FIFOs;
second storage locations for storing status information for each of said plurality of FIFOs;
a first port having a write data terminal for receiving write data and a write address terminal for receiving write addresses, each of said write addresses comprising a first portion for selecting a FIFO of said plurality of FIFOs and a second portion for selecting a storage location in said dual-port memory circuit; and
a second port having a read data terminal for providing read data and a read address terminal for receiving read addresses, each of said read addresses comprising a first portion for selecting a FIFO of said plurality of FIFOs and a second portion for selecting a storage location in said dual-port memory circuit.

2. The apparatus of claim 1, further comprising:
a channel comparison block configured to provide control data in response to said first portion of each of said write addresses and said first portion of each of said read addresses.

3. The apparatus of claim 2, further comprising:
write counter circuitry in communication with said first port and said channel comparison block; and
read counter circuitry in communication with said second port and said channel comparison block.

4. The apparatus of claim 3, wherein said write counter circuitry is configured to provide said second portion of each of said write addresses, and wherein said read counter circuitry is configured to provide said second portion of each of said read addresses.

5. The apparatus of claim 3, wherein said write counter circuitry comprises a write address counter and a write occupancy counter, and wherein said read counter circuitry comprises a read address counter and a read occupancy counter.

6. The apparatus of claim 3, wherein said write counter circuitry is configured to provide write status signals in response to said status information, and wherein said read counter circuitry is configured to provide read status signals in response to said status information.

7. The apparatus of claim 3, wherein said dual-port memory circuit comprises block random access memory embedded within a programmable logic device.

8. The apparatus of claim 7, wherein said channel comparison block, said write counter circuitry, and said read counter circuitry are formed using programmable logic blocks of said programmable logic device.

9. A method of implementing a first-in-first-out (FIFO) memory system in a dual-port memory circuit, comprising:
defining a plurality of FIFOs using first storage locations of said dual-port memory circuit;
selecting a FIFO of said plurality of FIFOs;
obtaining status information for said selected FIFO from second storage locations of said dual-port memory circuit;

selecting a storage location associated with said selected FIFO in response to said obtained status information for said selected FIFO;

performing an operation using said selected storage location;

updating said status information in response to said operation; and repeating said steps of selecting a storage location, performing an operation, and updating said status information a plurality of times;

storing said updated status information in said dual-port memory circuit; and repeating said step of selecting a FIFO a plurality of times.

10. The method of claim 9, wherein said operation is one of a read operation and a write operation.

11. The method of claim 9, further comprising:

providing status signals in response to said obtained status information.

12. The method of claim 9, wherein said dual-port memory circuit comprises block random access memory embedded within a programmable logic device.

13. A programmable logic device, comprising:

a dual-port memory circuit, including:

first storage locations for defining a plurality of FIFOs;

second storage locations for storing status information for each of said plurality of FIFOs;

a first port having a write data terminal for receiving write data and a write address terminal for receiving write addresses, each of said write addresses comprising a first portion for selecting a FIFO of said plurality of FIFOs and a second portion for selecting a storage location in said dual-port memory circuit; and a second port having a read data terminal for providing read data and a read address terminal for receiving read addresses, each of said read addresses comprising a first portion for selecting a FIFO of said plurality of FIFOs and a second portion for selecting a storage location in said dual-port memory circuit;

a first interface in communication with said dual-port memory circuit for providing said first portion of each of said write addresses and said write data; and a second interface in communication with said dual-port memory circuit for providing said first portion of each of said read addresses and for receiving said read data.

14. The programmable logic device of claim 13, further comprising:

a channel comparison block configured to provide control data in response to said first portion of each of said write addresses and said first portion of each of said read addresses.

15. The programmable logic device of claim 14, further comprising:

write counter circuitry in communication with said first port and said channel comparison block; and read counter circuitry in communication with said second port and said channel comparison block.

16. The programmable logic device of claim 13, wherein said dual-port memory circuit comprises block random access memory embedded within a programmable logic device.

* * * * *